United States Patent [19]

Prewo et al.

[11] Patent Number: 4,581,053
[45] Date of Patent: Apr. 8, 1986

[54] METHOD OF PRODUCING WOVEN FIBER REINFORCED GLASS MATRIX COMPOSITE ARTICLES

[75] Inventors: Karl M. Prewo, Vernon; George K. Layden, Wethersfield, both of Conn.

[73] Assignee: United Technologies Corporation, Hartford, Conn.

[21] Appl. No.: 381,804

[22] Filed: May 25, 1982

[51] Int. Cl.$^4$ .......................... C03C 23/20; B32B 9/00
[52] U.S. Cl. ...................................... 65/4.21; 65/18.1; 65/18.4
[58] Field of Search ................... 501/89, 95; 65/3.2, 65/4.21, 18.1, 18.4, 36, 43; 264/109, 111, 112, 125; 428/902, 114, 367, 697

[56] References Cited

U.S. PATENT DOCUMENTS

| | | | |
|---|---|---|---|
| 4,265,968 | 5/1981 | Prewo | 428/902 X |
| 4,284,664 | 8/1981 | Rauch | 428/902 X |
| 4,324,843 | 4/1982 | Brennan et al. | 428/114 X |
| 4,357,286 | 11/1982 | Stalcup et al. | 65/18.1 X |
| 4,368,234 | 1/1983 | Palmer et al. | 428/902 X |
| 4,370,390 | 1/1983 | Burk | 501/95 X |

*Primary Examiner*—Robert Lindsay
*Attorney, Agent, or Firm*—Harry J. Gwinnell

[57] ABSTRACT

A method of producing fiber reinforced glass composites of complex shapes (e.g. having curved portions such as cylindrical) is disclosed. A continuous length of fiber, such as silicon carbide, is passed through a slurry of glass powder and a carrier liquid containing a polymeric binder to impregnate the fiber. The impregnated fiber is next dried and woven into a predetermined structural shape. Plies of the woven fiber cut to near net shape may also be stacked into the desired shape. The thus laid fibers are hot pressed into a fiber reinforced glass matrix composite article having glass matrix distributed substantially uniformly therethrough and multiaxial strength in at least three mutually exclusive perpendicular directions.

4 Claims, 3 Drawing Figures 4,581,053

METHOD OF PRODUCING WOVEN FIBER REINFORCED GLASS MATRIX COMPOSITE ARTICLES

The Government has rights in this invention pursuant to Contract No. N00014-81-C-0218 awarded by the Department of the Navy.

DESCRIPTION

1. Technical Field

The field of art to which this invention pertains is molding, and particularly methods of molding fiber reinforced composite articles.

2. Background Art

Because of the scarcity and increasing expense of many conventional high temperature structural metals, increased attention has focused on non-metal fiber reinforced composites as replacements for conventional high temperature metal alloys. Use of metal replacement, high strength fiber reinforced resin and even high strength fiber reinforced metal matrix composites has progressed to the point of commercial acceptance in products ranging from sporting goods to advanced jet aircraft components. One of the big problems with these composites, however, has been their maximum use temperature.

Ceramic, glass and glass-ceramic bodies are known to the art which can be employed in high temperature applications. Unfortunately, however, these bodies frequently lack the mechanical strength desired and are invariably deficient in toughness and impact resistance. This situation has given rise to the preparation of composite bodies consisting of a matrix of ceramic, glass, or glass-ceramic material with inorganic fibers dispersed in continuous or discontinuous fashion therein. Henceforth referred to as glass matrix composites, these materials are described in U.S. Pat. Nos. 4,314,852 and 4,324,843. Glass-ceramic matrixsilicon carbide fiber composite components prepared according to the teachings of the above-referenced patents exhibit physical properties which permit their utilization in heat engines and other applications to effect significant improvement in performance. Such applications, however, require that novel methods of fabrication be found for the production of complex shaped parts with reinforcing fibers distributed for example in three dimensions to impart improved strength.

Even though great strides have been made in this area, difficulties exist in methods of preparing such improved composite articles. In the past, continuous fiber reinforcement for composite articles has been achieved through the use of collimated fiber tapes which are cut to size and oriented and then stacked in a die for hot pressing. However, this procedure is inadequate for more complex shapes in that it achieves only a planar array of fibers.

In current resin matrix composite technology this shortcoming is overcome through the use of woven fiber structures. The fibers are woven to make either cloth or actual three dimensional article shapes. After weaving, these articles can be easily infiltrated with resins due to both the very low viscosity achievable with resins prior to their curing and also the ease with which these resins wet the fibers.

While this approach has worked well for resin composites, it would be difficult to insure a uniform distribution of matrix when the higher viscosity glasses are used. Particularly, for large, tightly woven complex structures it may not be possible even for low viscosity glass to move throughout the structure uniformly and achieve full density. Also, many of the glasses of commercial interests have high viscosities over the temperature ranges in which they are chemically compatible with the reinforcing fibers. Furthermore, even if these difficulties are overcome, infiltration with a molten glass is particularly difficult if the fibers are woven tightly to achieve a high volume fraction of reinforcement or if the fibers resist infiltration through a lack of fiber-matrix wetting.

Accordingly, what is needed in this art is a method of forming fiber reinforced glass matrix composites of complex shape which insures a substantially uniform distribution of matrix glass.

DISCLOSURE OF INVENTION

The present invention is directed to a method of producing fiber reinforced glass matrix composite articles, which is particularly adapted to formation of such articles of a complex shape. The method comprises passing a continuous length of reinforcing fiber through a slurry of glass powder in a carrier liquid containing polymeric binder. The thus impregnated fiber is then dried, and woven into a predetermined structural shape. The thus woven and shaped article is then hot pressed into final form providing articles with multiaxial strength in three mutually exclusive perpendicular directions and substantially uniform matrix distribution.

Another aspect of the invention includes forming such article as above including stacking a plurality of such woven sheets cut to near net shape into the desired form followed by hot pressing such assembled sheets into final form.

The foregoing and other features and advantages of the present invention will become more apparent from the following description and accompanying drawings.

BEST MODE FOR CARRYING OUT THE INVENTION

Figure 1:
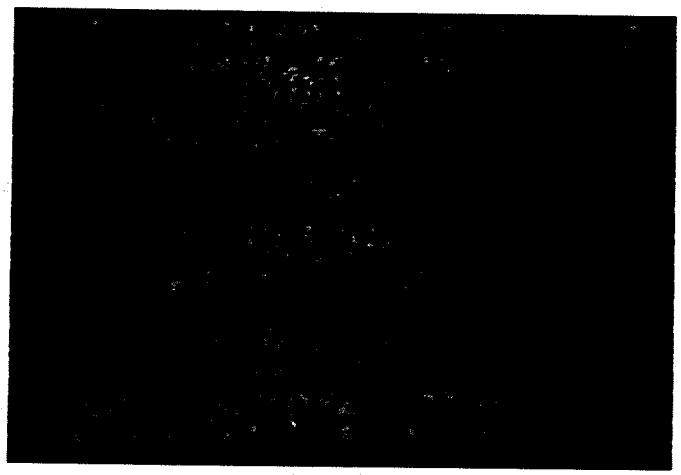
FIG. 1 shows a photomicrograph of the hot pressed woven fabric according to the present invention.

While any glass which will impart high temperature strength properties to composites according to the present invention can be used with the present invention, Corning 7740 (Corning Glass Works) borosilicate glass was found well-suited for this process. Similarly, Corning 7930 (about 96% by weight silica) obtained by leaching the boron from a borosilicate glass, and Corning 1723 are preferred high silica content glass and aluminosilicate glass, respectively. While the borosilicate glass and the aluminosilicate glass can be used in its as received —325 mesh size form, the desired properties for the high silica content glass composites have only been satisfactorily fabricated with the glass after it has been ball milled in propanol for more than 100 hours. It should also be noted that mixtures of the above glasses may also be used.

Another attractive matrix material for the process of the present invention is a glass-ceramic. During composite densification the matrix is retained in the glassy state, thus avoiding fiber damage and promoting densification under low applied pressure. After densification to the desired fiber plus matrix configuration, the glassy matrix can be converted to the crystalline state, the degree and extent of crystallization being controlled by the matrix composition and heat treatment schedule employed. A wide variety of glass-ceramics can be used in this manner, however, when using silicon carbide fibers a strict limitation on the amount and activity of titanium present in the glass is of controlling importance. Accordingly, if silicon carbide fibers and titania nucleating agents are used, the titania must be inactivated or kept below 1% by weight. This can be accomplished by simply substituting another nucleating agent such as zirconia for the conventional titania or adding an agent to mask the reactivity of the titania toward the silicon carbide fiber. However, in any case it is necessary to either eliminate or mask the effects of the titania on the silicon carbide fiber to attain a composite with good high temperature strength properties. And while conventional lithium aluminosilicate is the preferred glass-ceramic, other conventional glass-ceramics such as aluminosilicate, magnesium aluminosilicate, and combinations of the above can be used as long as the ceramic matrix material is titanium free (less than about 1% by weight) or masked. Note commonly assigned U.S. Pat. No. 4,324,843, the disclosure of which is incorporated by reference.

In general the starting glass-ceramic material can be obtained in the glassy state in powder form. If, however, the ceramic material is obtained in crystalline form, it will be necessary to melt the material to form it into the glassy state, solidify it and subsequently crush it into powder form, preferably about −325 mesh, prior to making up the slurries according to the present invention. It is important in selecting a glass-ceramic material that one be selected which can be densified in the glassy state with the viscosity low enough to permit complete densification with subsequent transformation into a substantially completely crystalline state. It is also possible, however, to convert the starting crystalline powder to the glassy state during preheat treatment prior to application of pressure for densification.

While any high temperature stable fiber material can be used in the method according to the present invention, such as graphite or alumina, silicon carbide fibers are especially preferred. A multifilament silicon carbide yarn with an average filament diameter up to 50 microns, for example 5 to 50 microns, is especially preferred. Nippon Carbon Company of Japan produces such a yarn with about 250 fibers per tow and an average fiber diameter of about 10 microns. The average strength of the fiber is approximately 2000 MPa and it has a use temperature of up to 1200° C. The yarn has a density of approximately 2.6 grams per cubic centimeter and an elastic modulus of approximately 221 GPa.

Any polymeric binder which dissolves or disperses readily in the particular carrier material selected can be used with the present invention. Acrylic latex material such as Rhoplex ® (Rohm and Haas Co.) has been found to be particularly suitable for use in the process of the present invention. Accordingly, any carrier material compatible with such binders can also be used, with water being preferred.

While the amounts of the materials can vary depending on the ultimate strength and properties desired in the final fabricated articles, the slurries generally contain 20–50% by weight glass powder, 10–20% by weight polymeric binder, and balance carrier liquid. Other components may be added to the slurry such as dispersing agents, etc. The slurry is generally coated on the fibers such that about 30% to about 80% by volume and typically about 50% by volume of the final product comprises the glass matrix.

Figure 2:
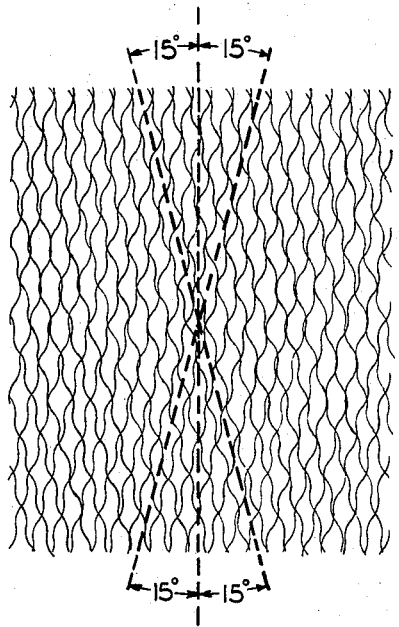
FIG. 2 shows a typical fiber orientation of a woven mat according to the present invention.
Figure 3:
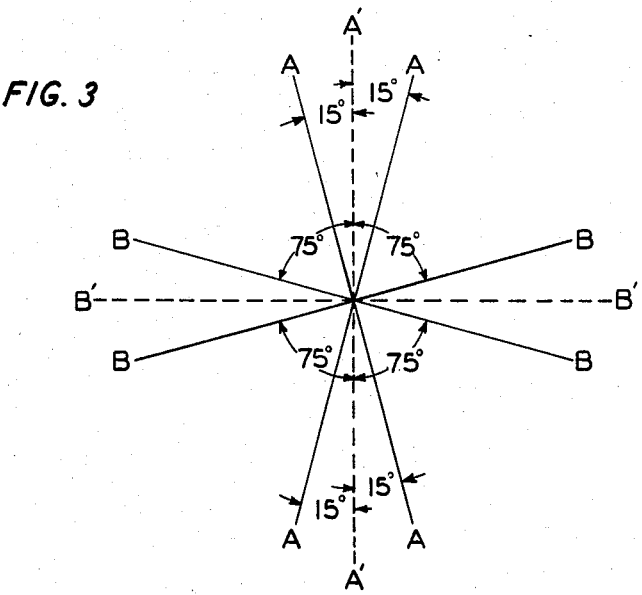
FIG. 3 shows typical fiber orientation of cut and stacked woven fibers according to the present invention.

The fibers can be woven by commercial weavers and/or in conventional fashion and are typically woven at an angle ±15° from the normal (note FIG. 2). Thus, in that embodiment of the present invention where plies of the woven material are cut to near net shape and overlaid, e.g. at weave axis angles 90° to one another, the resultant article is almost planar isotropic in character having fibers every 15° and 75° from the normal (note FIG. 3 where the solid lines indicate axes of the fibers, lines A and B indicating fibers of alternate sheets, and the broken lines A' and B' indicating the axes of fiber weaving).

Drying of the binder plus glass impregnated fiber can take place by any method desired such as air drying, or heat assisted drying. Hot pressing similarly can take place in any conventional apparatus under vacuum or inert gas such as argon in retal dies coated with colloidal boron nitride or graphite dies sprayed with boron nitride powder, for example. Pressures of 6.9–13.8 MPa (1000–2000 psi) and temperatures of approximately 1050° C.–1450° C. are typical.

EXAMPLE

Nicalon ® (Nippon Carbon Co.) silicon carbide yarn was unspooled and passed through a Bunsen burner flame to clean it. The cleaned fiber was then passed through a slurry containing approximately 400 grams of 7740 borosilicate glass and approximately 780 milliliters of water. The slurry also contained approximately 200 grams of Rhoplex binder. The impregnated fiber was then rolled onto a receiving drum and dried, the resulting fiber containing approximately 61% by volume glass and 38% by volume fiber. In drying on the drum the yarn flattened in shoelace fashion facilitating the subsequent weaving operation. The thus treated fiber was then woven into a belt containing fibers throughout its thickness as well as in plane at angles of ±15° to the principal belt axis (note FIG. 2). The belt was cut into squares which were arranged with the principal belt axis rotated 90° in alternating layers within a stainless steel alignment fixture. Note FIG. 3. The fixture was placed in an oven (air atmosphere) and heated to 700° C. to burn out the Rhoplex binder. The stack of tape was then hot pressed at 1000 psi at 1300° C. for 15 minutes under argon atmosphere (although vacuum or other inert gas can be used). Transverse microstructure of the resulting composite plate is shown in FIG. 1. This figure shows that the composite was well consolidated and contained about 40 volume percent fiber, corresponding nicely to the yarn prior to weaving as impregnated. This, obviously provides great facility in predetermining relative proportions prior to densification. Composite flexural strength measurements on the sample indicated a longitudinal strength of 35,000 psi.

Depending upon the desired matrix properties, it may or may not be desirable to incorporate the pyrolysis residue of the organic binder into the matrix. In the former case (with residue) the hot pressing of the woven article will take place in inert atmosphere. In the latter case (without residue) a suitable heat treatment to decompose the organic binder prior to application of pressure is either incorporated into the hot pressing cycle, or is effected in a separate heat treatment for that particular binder/woven article prior to hot pressing.

Typical complex shapes which may be made by the process of the present invention include cylindrical shapes such as gun barrels, hollow containers such as cups, I-beams, gas-turbine-engine fan blades and hinge-plates for augmentor flaps, etc. The articles of the present invention based on the compositions of the components also have particular utility as high temperature structural components in environments where oxidation resistance, high strength, and toughness are required, for example as gas turbine engine or internal combustion engine components. In this regard note also U.S. Pat. No. 4,324,843, the disclosure of which is incorporated by reference.

Although the invention has been shown and described with respect to detailed embodiments thereof, it should be understood by those skilled in this art that various changes and omissions in form and detail may be made therein without departing from the spirit and scope of the invention.

We claim:

1. A method of producing a high strength fiber reinforced glass matrix composite article, particularly adapted to making such articles of complex shape, comprising passing a continuous length of a plurality of high temperature stable silicon carbide, graphite or alumina fibers through a slurry of glass powder selected from the group consisting of aluminosilicate, lithium aluminosilicate, magnesium aluminosilicate, borosilicate, or mixtures thereof, and a carrier liquid containing a polymeric binder to impregnate the fibers, drying the impregnated fibers, weaving the impregnated fibers into a predetermined structural shape, and hot pressing the woven fibers into a fiber reinforced glass matrix composite article having multiaxial strength in three mutually exclusive perpendicular directions.

2. A method of producing a high strength fiber reinforced glass matrix composite article, particularly adapted to making such articles of complex shape, comprising passing a continuous length of a plurality of high temperature stable silicon carbide, graphite or alumina fibers through a slurry of glass powder selected from the group consisting of aluminosilicate, lithium aluminosilicate, magnesium aluminosilicate, borosilicate, or mixtures thereof, and a carrier liquid containing a polymeric binder to impregnate the fibers, drying the impregnated fibers, weaving the impregnated fibers, cutting the woven fibers and stacking a plurality of layers of said cut woven fibers on each other to form a substantially final composite shape, and hot pressing the stacked fibers into a fiber reinforced glass matrix composite article having multiaxial strength in three mutually exclusive perpendicular directions.

3. The method of claim 2 wherein the carrier liquid is water and the polymeric binder is acrylic resin.

4. The method of claim 1 wherein the carrier liquid is water and the polymeric binder is acrylic resin.

* * * * *